June 2, 1964
E. A. CLARK
3,135,226
CANDY MAKING MACHINE
Filed Sept. 12, 1960
3 Sheets-Sheet 1
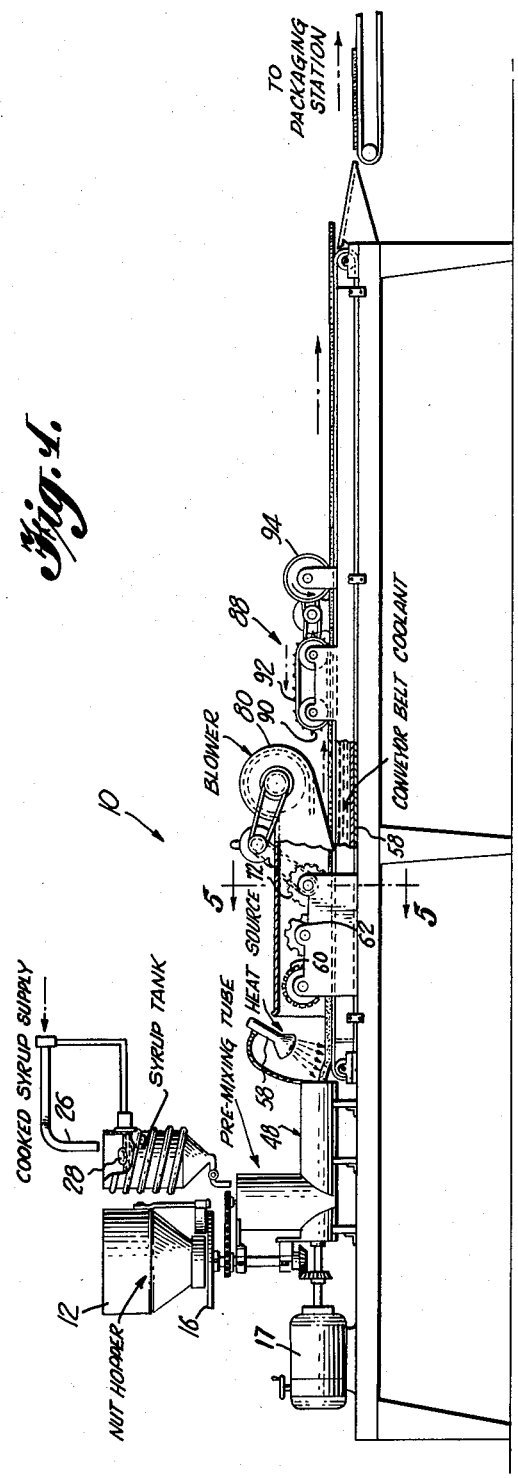
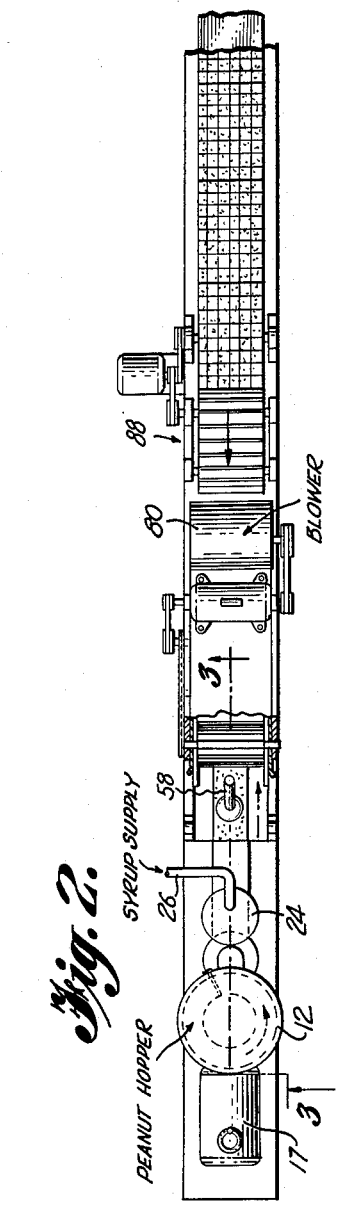
INVENTOR
*Earl A. Clark*
BY
*Mason, Fenwick & Lawrence*
ATTORNEYS

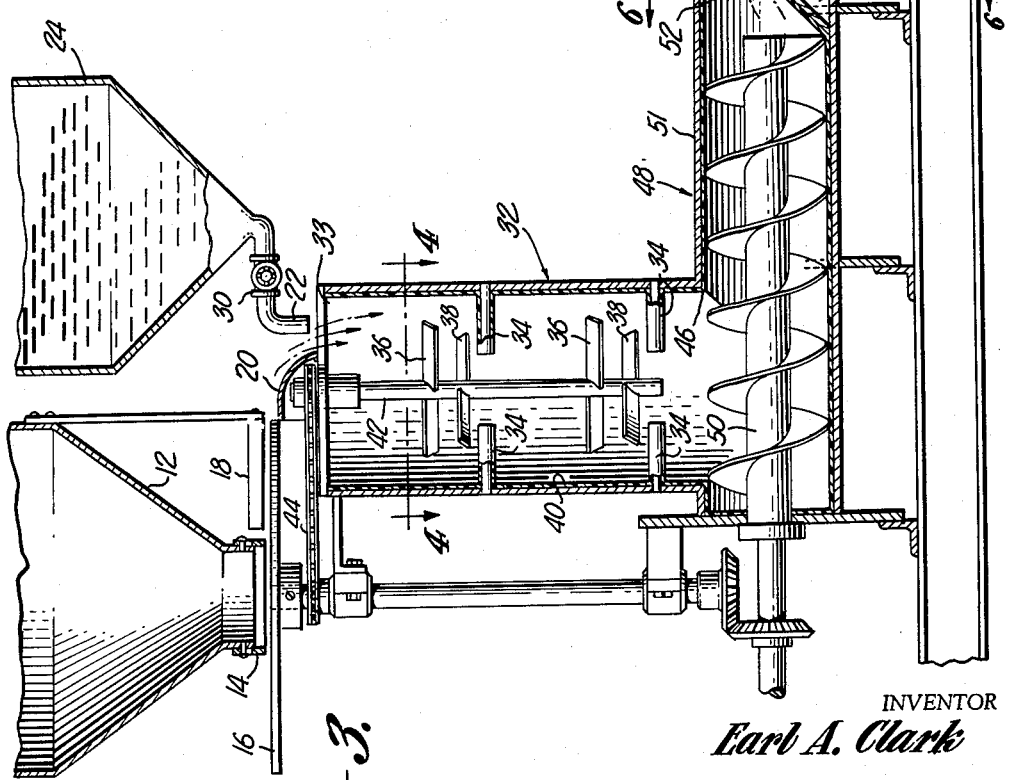

June 2, 1964  E. A. CLARK  3,135,226
CANDY MAKING MACHINE
Filed Sept. 12, 1960  3 Sheets-Sheet 3

INVENTOR
Earl A. Clark

BY Mason, Fenwick & Lawrence
ATTORNEYS

United States Patent Office 3,135,226
Patented June 2, 1964

3,135,226
CANDY MAKING MACHINE
Earl A. Clark, 1143 Manchester Ave., Norfolk, Va.
Filed Sept. 12, 1960, Ser. No. 55,524
8 Claims. (Cl. 107—4)

This invention relates generally to apparatus for making hard candy. More particularly, this invention relates to a machine for automatically producing a uniform and continuous hard candy filled with nuts and the like.

The candy industry in the past has recognized the need for automation in the production of the variety of products on the market today. However, there are certain candies which have not been successfully made with presently known automatic machines, primarily because of the nature and content of the candy. Among such are hard candies having a whole or half peanut or nut-like filling.

Candies of this size nut having a candy matrix have generally been found, when automation is attempted, to yield a somewhat nonuniform product and discontinuous product in which there is a poor distribution of the nuts within the candy matrix. Additionally, the nuts have in many instances been broken or crushed during processing, and there resulted more of a peanut butter-like candy than the desired whole or semi-whole piece nut candy. The primary reasons for these failures are that the ingredients of the nut candy are not added uniformly and not mixed properly, nor forced through the machine correctly without a loss of continuity of the candy. Moreover, prior machines have attempted to extrude the candy to final thickness without the use of sizing rollers.

To applicant's knowledge, no machine was known to the candy art which permitted the automatic production of the desired uniform continuous nut candy.

In the past, the candy of the whole or semi-whole nut type could only be made satisfactorily by a long and tedious manual process, which proved to be inefficient and time consuming. This process briefly for peanut candy may be summed up in the following outline:

A solution of sugar syrup and corn syrup is cooked to the desired temperature in a small batch. When this temperature is reached, blanched peanuts, which have been warmed, are stirred into the syrup to make a mixture of roughly 50% peanuts and 50% syrup. The entire mixture is then dumped on a table. But since this mass will not flow easily, it is spread, using forks, spoons or other implements, and then rolled down to the desired thickness with a hand rolling pin. After it is rolled down, it is cut into slabs for ease in handling through mechanical cutters, or in many cases it is entirely hand-cut on the table where the candy is made. Surprisingly, all the nut candy made today is to applicant's knowledge, produced by this antiquated method.

Consequently, the primary object of this invention is to provide a machine which automatically produces a whole or semi-whole nut candy that is continuous, uniform and of a desired thickness.

Another object of this invention is the provision in combination of a means cooperating with a mixing tube to produce a continuous and uniform flow through the candy machine.

Another object of this invention is to provide a novel drive and mixing means in the mixing tube, which co-operates in combination with a particular screw conveyor means and orifice to assure a uniform and continuous composition for the nut candy, as well as control the thickness of the candy.

Another object of this invention is the provision of a particular sizing means which cooperates to both gradually reduce the thickness of the candy flow, as well as provide a drive means for the candy along a smooth surfaced conveyor.

This invention also has for an object the provision of a jacket cooling means to reduce the temperature of the flowing candy and also the sizing means.

One of the particular objects of this invention is the provision of a mixing tube having a restricted orifice at the outlet of a screw conveyor means which permits size reduction of the flowing candy, but does not crush the candy.

Other objects and advantages of the present invention will become apparent to those skilled in the art, from the following description when read in conjunction with the following drawing, wherein:

FIGURE 1 is a side elevational view partly in section showing the entire novel candy making machine;

FIGURE 2 is a plan view partly in section of the novel candy making machine;

FIGURE 3 is an enlarged side sectional view showing the details of the pre-mixing tube, the screw conveyor, the sizing rollers, and the cooling jacket means;

FIGURE 4 is a sectional view along lines 4—4 of FIGURE 3;

Figure 5:
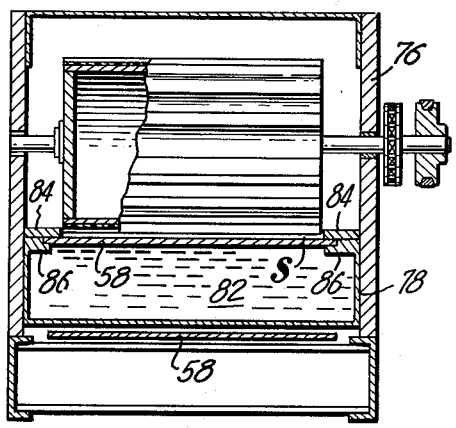
FIGURE 5 is a sectional view in elevation along lines 5—5 of FIGURE 1, showing the cooling jacket means and one of the sizing rollers.
Figure 6:
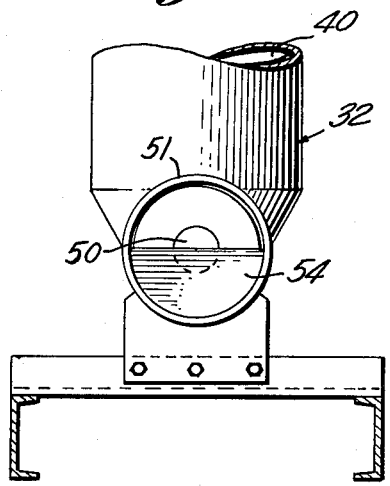
FIGURE 6 is a view taken along line 6—6 of FIGURE 3, and shows the orifice restriction at the outlet of the screw conveyor means.

The novel candy making machine comprising the present invention consists generally of the combination of a pre-mixing tube which at its inlet is provided with a peanut hopper and syrup tank feeding metered and calculated amounts of nuts and syrup, respectively, to the pre-mixing tube. The pre-mixing tube includes rotatable paddle means which cooperate with elongated rod members protruding from the inner periphery of the pre-mixing tube to provide mixing and driving means sufficient to assure uniform composition of the candy, and to urge this composition towards the screw conveyor means which communicates with the outlet at the lower portion of the pre-mixing tube. The screw conveyor carries the candy through an orifice forming its outlet, which orifice is particularly designed to prevent the crushing of the nuts in the candy, and yet is small enough in size to form a flow of candy therethrough which may be easily sized subsequently to a proper thickness. Heating means at the orifice helps to prevent premature hardening of the candy. A smooth belt conveyor receives the flow of candy from the orifice and carries it beneath sizing rollers, which in addition to sizing the nut candy strip, grip the candy to move it along with the smooth surface belt conveyor. Cooling jacket means, including cooling air above the belt conveyor and cooling water below the belt are provided to properly cool the sizing rollers and the belt. Cutting and scoring means are provided further along the belt before the candy is moved to the packaging station.

More specifically, the novel candy making machine 10 is composed of a nut hopper 12, which may be of conventional design and size, but which has associated with it a gate sleeve 14 for controlling the flow of nuts through the hopper. The control of the nuts may be by any convenient means such as the sleeve 14, that permits a desired quantity of nuts to pass through the hopper in a given period of time. The nuts falling through the hopper 12 are received onto a rotatable table 16 which is driven by any conventional means such as motor 17 connected by suitable drives and gearing, as best shown in FIGURE 3. As the nuts are carried on the table 16, a scraper blade 18, which may be conveniently attached to the side of the nut hopper, for example, directs the nuts outwardly from the center of the table, and then off the table onto guard plate 20. Adjacent guard plate 20 is pipe 22, communicating with a syrup tank 24, which is filled with cook syrup by supply pipe 26. Heating coils 27 maintain the desired temperature in the tank 24. The level of the syrup in the syrup tank is maintained at a desired level by liquid level detecting means 28, which is of conventional design and which operates to provide additional syrup to the tank when the amount of syrup in the tank drops below the desired quantity. Manual control valve 30 in pipe 22 meters the proper amount of syrup from the syrup tank into pre-mixing tube 32 through its inlet 33. The control and metering means 14 and 30 of the nut hopper and syrup tank, respectively, may be manually operated, or may be controlled automatically by any conventional means which maintains the proper ratio of nuts to syrup flowing into the pre-mixing tube. Generally, a mixture of approximately 50% peanuts, for example, and 50% cooked sugar syrup is desirable, but it should be readily understood that this figure is not critical and may be varied at will, particularly for different types of candy.

The pre-mixing tube 32, as shown best in FIGURE 3, is a vertical cylindrical tube having a plurality of rod-like members 34 protruding from the inner periphery of the premixing tube. These members 34 are shown in FIGURE 4 to be in pairs at each particular level, in diametrically opposed relationship, each extending approximately 1/3 across the pre-mixing tube. Cooperating with each pair of members 34 are pairs of paddles 36 and 38. As seen in FIGURE 4, the paddles 36 and 38 are not of the same length, but rather, paddle 36 is preferably about 2/3 of the diameter of the tube, while paddle 38 extends as close to the side wall 40 of the pre-mixing tube 32, as is possible. As clearly shown in FIGURE 3, the paddles 36 and 38 are mounted for rotation on vertical shaft 42, which may be rotated for convenience by the same means which rotates nut table 16. Such means providing the rotation is shown as a chain 44 in FIGURE 3. Also it is to be noted that the paddles 36 and 38 are each mounted along the shaft 42, such that they are disposed vertically above the rod members 34. In this way the paddles act as the driving means for the mixture of nuts and syrup, urging this composition through the mixing tube. However, with the rods 34, this composition is mixed and agitated to produce the uniformity heretofore not achieved in prior constructions. As can be readily understood, the rods interrupt and obstruct the downward movement of the candy composition, and create a turbulance which properly mixes the composition to produce the desired uniformity. Yet, by reason of the fact that the rods are relatively small in diameter or width, as little obstruction to the flow of nut candy composition as is possible is achieved.

As shown in the drawings, each pair of rod members has associated therewith along the shaft 42, a pair of paddle members of the type described. The number of such sets or groups of rods with associated paddles is optional. However, it has been found that generally not more than two is required.

The pre-mixing tube 32 has an outlet 46, which communicates with screw conveyor means 48. Included in the screw conveyor means is a screw conveyor 50 which may be rotated, for example, by the same power means 17 which rotates the peanut table and the paddles in the pre-mixing tube. This convenient connection is shown in FIGURE 3. The screw conveyor operates to merely transport the uniform candy composition fed to it by the rotating paddles 36 and 38. This is a relatively important feature in the present invention, inasmuch as the candy produced must be continuous, and therefore, the screw conveyor must not be a driving force to the extent that it is the means which moves the candy through the pre-mixing tube. It has been found that the screw conveyor must at all times be filled with candy and move along fast enough to carry the candy through the cylindrical screw conveyor shield 51. Therefore, the screw conveyor is not designed to control the rate of flow of the candy directly, but rather, controls the continuity of the candy. The uniformity of composition of the candy composition is determined by the fact that the desired quantity of nuts and syrup is fed into the pre-mixing tube in such a quantity that the paddles in cooperation with the rod-like members adequately and properly mix the candy before driving it into the screw conveyor means. At the outlet 52 of the screw conveyor means is positioned a restriction 54 which operates to size the candy flowing from the pre-mixing tube down to a desired thickness. The size of the orifice must be large enough to permit the nuts to pass through without crushing, which has been the usual result with prior art machines. It has been found that the opening must be approximately at least 3/4 of an inch.

Therefore, it can be seen that the screw conveyor extrudes the nut candy down to approximately a size of about 3/4 of an inch thickness, from which it is easily reduced further to about 3/8 of an inch. It is important that the flow of candy S from the orifice be such that its thickness permits subsequently applied sizing means to reduce the thickness to the desired amount. However, the orifice cannot be too small, nor can it be in most instances the size of the thickness desired for the final product, inasmuch as the nuts will be crushed and only peanut butter will result. As the flow of nut candy strip S emerges from the orifice 52 of the screw conveyor, it is received on a guide lip 56 which directs its travel to the belt conveyor 58. This belt conveyor may be a conventional type of belt, which must have a relatively smooth surface, in order to prevent sticking of the candy to the belt. Any ordinary metal or plastic belt will be suitable if coated with a material to further prevent sticking. Material of this type is "Teflon." As shown in FIGURE 3, heating means 58 may be provided to direct heat rays onto the flowing material as it emerges from the screw conveyor means, thus preventing premature hardening of the candy before it has been sized.

As the candy moves along the machine on the conveyor belt 58, it reaches the sizing rollers 60, 62 and 64. It is to be noted that each of these rollers has a degree of corrugation or depth of groove inversely proportional to its distance from the orifice 52 of the screw conveyor means. The purpose of the corrugation is to prevent the slipping of the candy relative to the belt when the candy strip comes in contact with the first roller. As shown in FIGURE 1, the roller 60 is cleated at 66, to provide deep grooves 68 in its outer periphery. The purpose of the grooves and cleats is two-fold: (1) to reduce the thickness of the candy strip; (2) to provide the motivating means for moving the candy along the smooth conveyor belt. Each succeeding roller 62 and 64 has grooved surfaces 70 and 72, respectively, in its outer periphery, as is shown in roller 62 of FIGURE 3. Roller 62 is designed to further reduce the candy strip in thickness as it proceeds past roller 60, as also is shown in FIGURE 3, by reason of the fact that the diameter of the roller 62 is somewhat larger than the roller 60. Roller 64 is similar to roller 62, except that the grooves 72 are shallower than corresponding grooves 70 in roller 62. In a manner similar to the relationship between roller 62 and roller 60, roller 64 is slightly larger than roller 62, in order that this roller may size the candy strip S down to the final desired thickness. By reason of the fact that grooves 72 are shallowest, the candy strip emerges from beneath roller 64 as a relatively smooth surface, which is desirable.

Because of the heat emanating from the candy strip S, it is necessary to cool the rollers and also to cool the under side of the belt 58, to permit release of the candy from the belt without distortion of the candy. For such purpose, cooling jacket means 74 is provided. As shown, this cooling jacket comprises an upper gas retaining housing 76 and a lower liquid housing 78. As shown best in FIGURES 3 and 5, the upper housing is adapted to cooperate with a blower 80, positioned at the packaging side of the last roller to maintain a stream of cooling air flowing across the sizing rollers. This blower also tends to cool the upper portion of the candy strip S as it moves along with the conveyor belt 58. In order to cool the under portion of the candy, there is provided in the lower housing 78 a liquid coolant such as water, which is adapted to contact the under portion of the belt 58, and thereby conduct heat away from the under portion of the candy strip S. As is shown in FIGURE 5, the lower housing 78 encompasses the liquid coolant medium 82 between the upper and lower portions of the belt 58. In such a manner, the under side of the upper portion of the belt 58 may be in contact with the liquid coolant as it slides along between upper and lower guides 84 and 86.

After the candy strip S leaves the last roller 64, it proceeds along to conventional cutting and scoring means shown generally at 88. This cutting and scoring means severs pieces of a desirable size from the belt, by means of long knives 90, and transversely scores intermediate portions of the candy strip by means of scorers 92. Longitudinal scoring is achieved by means of scoring rollers 94, also conventional. It is not believed necessary to go into detail in regard to the cutting and scoring means, inasmuch as this does not form a part of the present invention, but rather is of conventional construction previously used in the candy industry for other types of candy products. After leaving the cutting and scoring means 88, the scored and cut pieces of candy proceed along to a conventional packaging station for wrapping.

Figure 8:
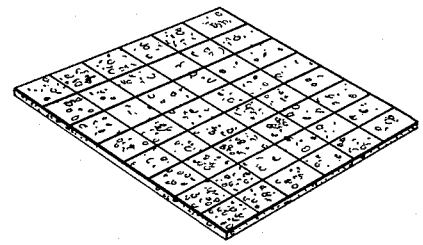
FIGURE 8 is a perspective view of a type of nut candy produced by this machine.

FIGURE 8 shows the final product horizontally and longitudinally scored in desired fashion, in order to facilitate breaking small pieces from the relatively large piece shown.

Figure 7:
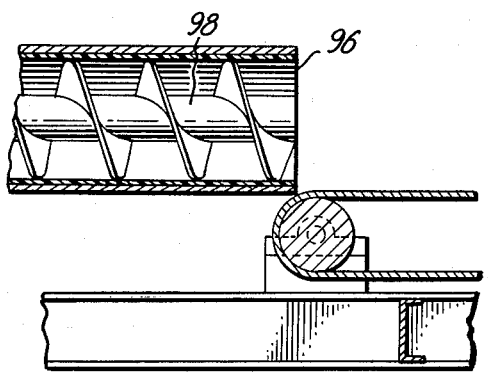
FIGURE 7 is a view showing an alternate construction for the orifice of the screw conveyor means.

FIGURE 7 is an alternate showing of the screw conveyor means in which the orifice 96 does not have the restriction, but rather has an opening approximately the minimum ¾ inch size, which is preferable, and which permits the reduction of the final size of the candy to about ¼ to ⅜ of an inch. Of course, the screw conveyor 98 in this case must be reduced in size to conform to the orifice 96. As was described in connection with the preferred modification in FIGURES 1 through 6, FIGURE 7 has similar belt conveyor and cooling jacket means, as well as the same pre-mixing tube.

It has been found that it is most desirable for the operation of the novel candy making machine that all parts contacting the candy when in a sticky or non-cooled condition, be coated with "Teflon."

The operation of the candy machine comprising the present invention should be clear from the foregoing description. However, to facilitate a further understanding thereof, the following summary may be helpful.

In operation, the nut hopper is filled with nuts such as peanuts, and the syrup tank filled with sugar syrup or malt solution, both of which are common and well known in the candy industry. The liquid level gauge 28, when set in operation, assures that the proper level of syrup is maintained in the syrup tank. The gate sleeve 14 at the bottom of the hopper is vertically adjusted to permit the desired number of peanuts to be received upon the rotating table 16. At the same time, valve 30 is adjusted to permit the continuous flowing of the syrup into pre-mixing tube 32. The rate of additions of the peanuts and syrup are adjusted to maintain the suggested 50–50 composition. As the peanuts and syrup composition flow into pre-mixing tube 32, rotating paddles 36 and 38 drive the composition downwardly to rods 34, which act to agitate and mix the composition in order to achieve the desired uniformity. As the nut candy proceeds further down through the mixing tube, additional paddles 36 and 38 further force the nut candy into contact with additional rod members 34 to assure the desired uniformity in the candy composition.

The candy upon reaching the screw conveyor means 48, is carried by the screw conveyor 50 along the conveyor shield 51, and finally is extruded through restricted orifice 52. The candy strip S emerging from the orifice, is laid onto the conveyor belt which cooperates with the sizing rollers 60, 62 and 64 to gradually reduce the thickness of the candy strip to the desired thickness. In order to prevent the candy strip from sliding on the smooth conveyor belt 58, the sizing rollers are roughened with the depth of the grooves inversely proportional to the distance of the roller from the orifice, the grooves 68, 70 and 72, therefore, being of progressively less depth.

In order to properly cool the candy and maintain the belt properly cooled, jacket means 74 is provided to house the belts as well as the sizing rollers. The lower portion of the cooling jacket means 74 includes the lower housing 78, which is adapted to contain liquid coolant 82, kept in contact with the under side of the upper portion of the belt 58. Blower 80 is connected to the upper housing 76, in order to cool both the rollers and the upper surface of the candy strip S.

The candy strip proceeds further to the conventional cutting and scoring means 88 and thence to a conventional packaging station.

It has been found desirable to provide adjustable means for varying the height of the sizing rollers above the belt 58, in order to vary the thickness of the candy strip passing individual rollers.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What is claimed is:

1. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, means mounted within said tube for agitating and uniformly driving said nuts and candy through said tube, said means for agitating and driving comprising a rotating paddle means extending within the tube and a pair of diametrically opposed elongated rod-like members protruding from the inner periphery of said tube and positioned below said paddle means, a substantially horizontally disposed screw conveyor means communicating with said tube outlet to provide a continuous passage for the nuts and candy, said screw conveyor means having an orifice at an end remote from said tube outlet, said orifice being at least of a size sufficient to permit the nuts and candy to pass therethrough without crushing said nuts, belt conveyor means positioned adjacent said orifice and adapted to receive a strip of nut candy being discharged from said orifice, a plurality of sizing means positioned along said belt conveyor and adapted to compress the candy strip to a desired thickness, the construction and arrangement being such that a continuous and uniform flow of nut candy is produced.

2. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, means mounted within said tube for agitating and uniformly driving said nuts and candy through said tube, said means for agitating and driving comprising pairs of rotating paddle means extending within the tube and a pair of opposed elongated rod-like members protruding from the inner periphery of said tube and positioned below each pair of paddle means, a substantially horizontally disposed screw conveyor means communicating with said tube outlet to provide a continuous passage for the nuts and candy, said screw conveyor means having an orifice at an end remote from said tube outlet, said orifice being at least of a ¾ inch diameter size sufficient to permit the nuts and candy to pass therethrough without crushing said nuts, belt conveyor means positioned adjacent said orifice and adapted to receive a strip of nut candy being discharged from said orifice, a plurality of sizing means positioned along said belt conveyor and adapted to compress the candy strip to a desired thickness, the construction and arrangement being such that a continuous and uniform flow of nut candy is produced.

3. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, means mounted within said tube for agitating and uniformly driving said nuts and candy vertically through said tube, a substantially horizontally disposed screw conveyor means communicating with said tube outlet to provide a continuous passage for the nuts and candy, said screw conveyor means having an orifice at an end remote from said tube outlet, said orifice being at least of a size sufficient to permit the nuts and candy to pass therethrough without crushing said nuts, belt conveyor means positioned adjacent said orifice and adapted to receive a strip of nut candy being discharged from said orifice, a plurality of sizing means positioned along said belt conveyor and adapted to compress the candy strip to a desired thickness, said sizing means comprising a plurality of rollers having grooved surfaces, the depth of the grooves in the rollers varying inversely with the distance of the roller from said orifice, the construction and arrangement being such that a continuous and uniform flow of nut candy is produced.

4. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, means mounted within said tube for agitating and uniformly driving said nuts and candy vertically through said tube, a substantially horizontally disposed screw conveyor means communicating with said tube outlet to provide a continuous passage for the nuts and candy, said screw conveyor means having an orifice at an end remote from said tube outlet, said orifice being at least of a size sufficient to permit the nuts and candy to pass therethrough without crushing said nuts, belt conveyor means positioned adjacent said orifice and adapted to receive a strip of nut candy being discharged from said orifice, said belt conveyor means having a smooth surface to facilitate removal of said nut candy and a cooling jacket means surrounding said conveyor means, a plurality of sizing means positioned along said belt conveyor and adapted to compress the candy strip to a desired thickness, said sizing means comprising a plurality of rollers having grooved surfaces, the depth of the grooves in the rollers varying inversely as the distance from the roller to the orifice decreases, the construction and arrangement being such that a continuous and uniform flow of nut candy is produced.

5. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, means mounted within said tube for agitating and uniformly driving said nuts and candy vertically through said tube, said means for agitating and driving comprising a rotating paddle means extending within the tube and a pair of diametrically opposed elongated rod-like members protruding from the inner periphery of said tube and positioned below said paddle means, said paddle means comprising first and second rotatable paddles of different diameter, said rotating paddles acting to drive the nuts and candy through said tube, a substantially horizontally disposed screw conveyor means communicating with said tube outlet to provide a continuous passage for the nuts and candy, said screw conveyor means having an orifice at an end remote from said tube outlet, said orifice being at least of a ¾ inch diameter size sufficient to permit the nuts and candy to pass therethrough without crushing said nuts, said orifice having a restriction thereacross to permit a uniform flow therethrough, belt conveyor means positioned adjacent said orifice and adapted to receive a strip of nut candy being discharged from said orifice, said conveyor means having a smooth surface to facilitate removal of said nut candy and a cooling jacket means surrounding said conveyor means, said cooling jacket means comprising a water trough adapted to maintain water in contact with the lower surface of said belt conveyor means and fan means constructed to cool the top of the nut candy and so directed that the rollers are cooled thereby, a plurality of sizing means positioned along said belt conveyor and adapted to compress the candy strip to a desired thickness, said sizing means comprising rollers having at least one of said rollers provided with cleats on its outer periphery, the construction and arrangement being such that a continuous and uniform flow of nut candy is produced.

6. A machine for automatically and continuously producing nut candy from nuts and candy comprising a substantially vertically disposed mixing tube having an inlet and an outlet, means cooperating with the inlet of said tube for maintaining a continuous flow of nuts and candy to said tube, rotatable paddle means mounted within said tube for driving said nuts and candy vertically through said tube, said paddle means comprising first and second angularly disposed rotatable paddles of different diameter, said rotating paddles acting to drive the nuts and candy through said tube, a pair of diametrically opposed elongated rod-like members protruding from the inner periphery of said tube and positioned below said paddle means and adapted to cooperate with said paddle means to mix said nuts and candy, a substantially horizontally disposed screw conveyor means communicating with the outlet of said tube to provide a continuous passage for the nuts and candy, said screw conveyor means having an orifice at one end remote from said tube outlet, said conveyor means being adapted to maintain a continuous flow of nut candy through said orifice, and belt conveyor means receiving said flow of candy from said orifice the construction and arrangement being such that a continuous and uniform flow of nut candy is produced.

7. The machine as defined in claim 1, including surface means on said sizing means for compressing the candy strip and moving the candy along said belt, said surface means increasing in effectiveness as the distance from said orifice increases.

8. A machine for automatically and continuously producing nut candy from nuts and candy comprising a substantially vertically disposed mixing tube having an inlet and an outlet, means cooperating with the inlet of said tube for maintaining a continuous metered flow of nuts and candy to said tube, rotatable paddle means mounted within said tube for driving said nuts and candy vertically through said tube, a substantially horizontally disposed screw conveyor means communicating with the outlet of said tube to provide a continuous passage for the nuts and candy, said screw conveyor means having an orifice at one end remote from said tube outlet, said conveyor means being adapted to maintain a continuous flow of nut candy through said orifice, and belt conveyor means receiving said flow of candy from said orifice, wherein said sizing means comprises a plurality of rollers having grooved surfaces, the depth of the grooves in the rollers decreasing as the distance of the rollers from the orifice increases, and the construction and arrangement being such that a continuous and uniform flow of nut candy is produced.

References Cited in the file of this patent

UNITED STATES PATENTS

| | | |
|---|---|---|
| 92,738 | Mitchell | July 20, 1869 |
| 891,823 | Dickinson | June 30, 1908 |
| 1,002,411 | Lovelady et al. | Sept. 5, 1911 |
| 1,393,144 | Laskey | Oct. 11, 1921 |
| 1,479,898 | Collins et al. | Jan. 8, 1924 |
| 1,522,738 | Miller | Jan. 13, 1925 |
| 1,778,537 | Steely | Oct. 14, 1930 |
| 1,792,059 | Altwegg | Feb. 10, 1931 |
| 2,088,247 | Paton | July 27, 1937 |
| 2,703,059 | Kaser | Mar. 1, 1955 |
| 3,009,427 | Bell | Nov. 21, 1961 |